Sept. 4, 1956 B. WILD 2,761,367
AUTOMATIC HITCH FOR TWO-WAY PLOW
Filed Sept. 3, 1952 5 Sheets-Sheet 1
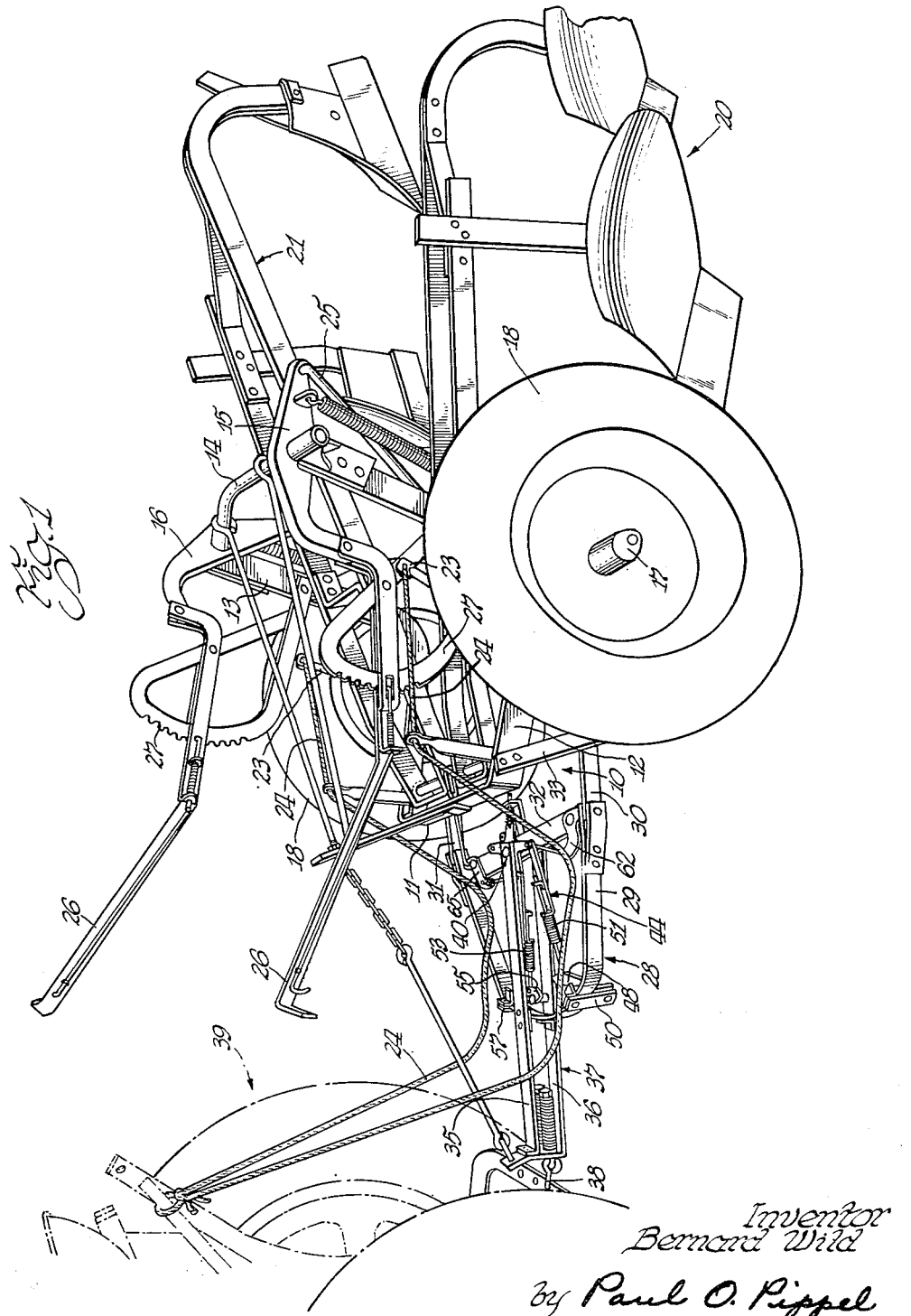
Inventor
Bernard Wild
by Paul O. Pippel
Atty.

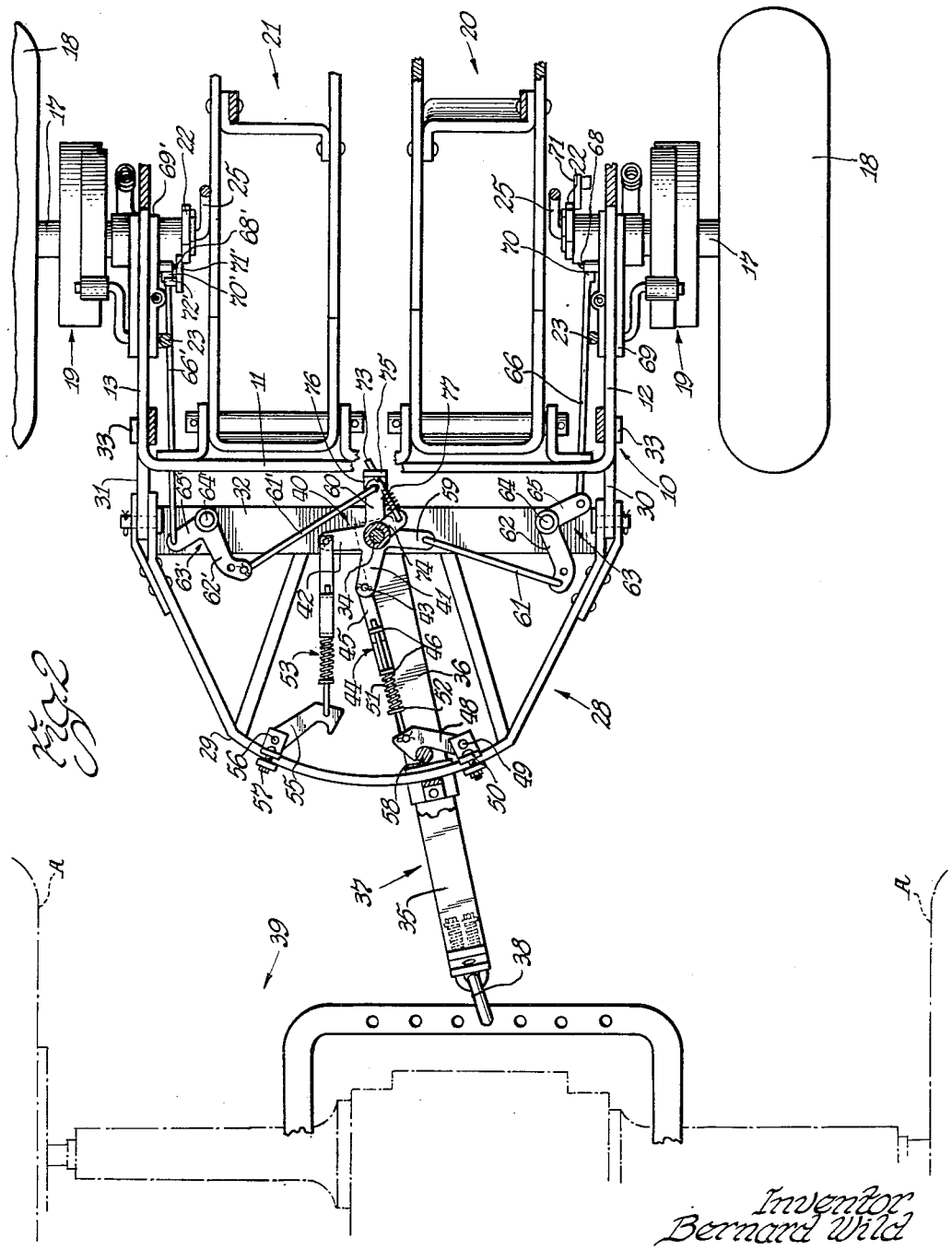

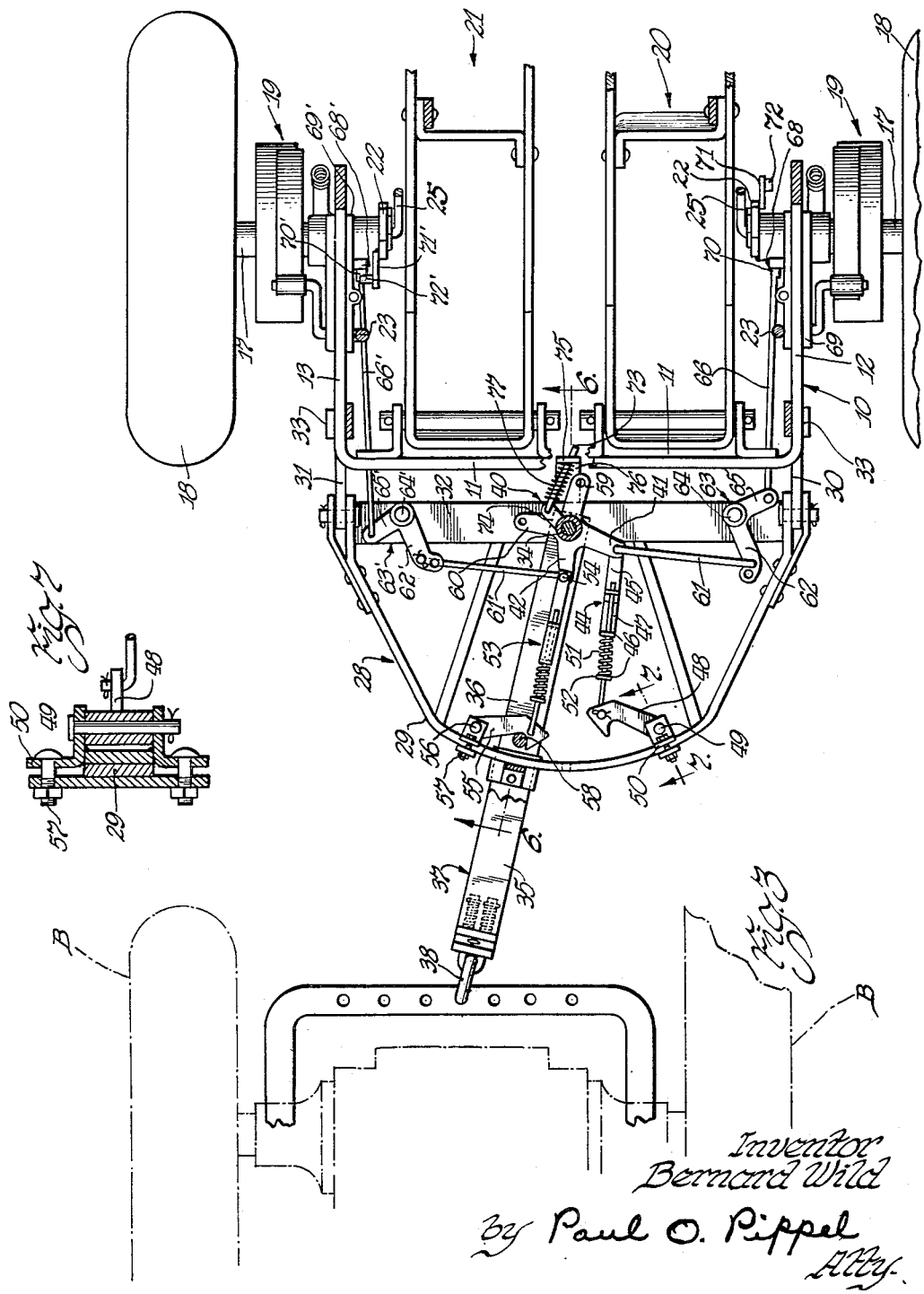

Sept. 4, 1956 B. WILD 2,761,367
AUTOMATIC HITCH FOR TWO-WAY PLOW
Filed Sept. 3, 1952 5 Sheets-Sheet 4
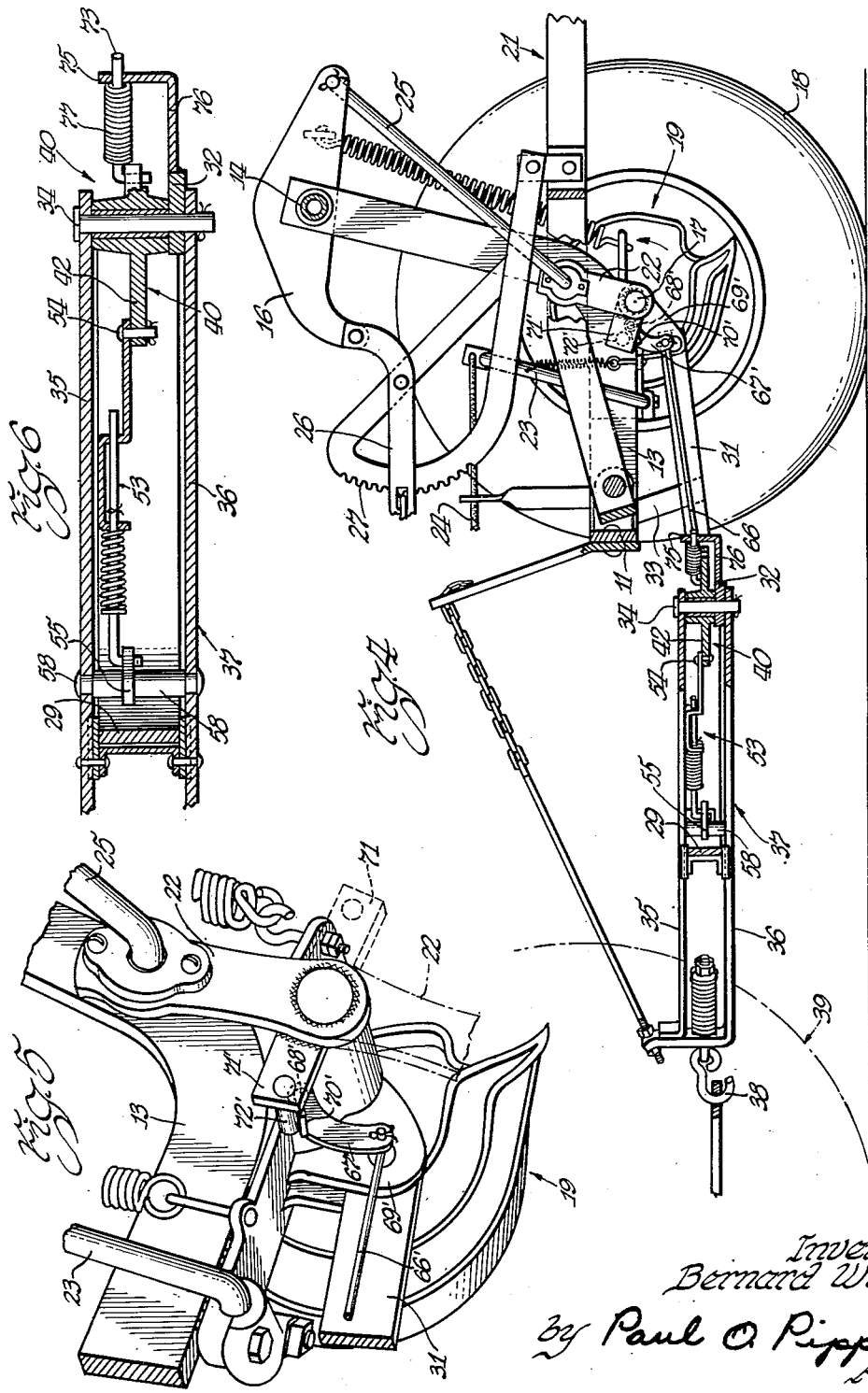
Inventor
Bernard Wild
by Paul O. Pippel
Atty.

Sept. 4, 1956
B. WILD
2,761,367
AUTOMATIC HITCH FOR TWO-WAY PLOW
Filed Sept. 3, 1952
5 Sheets-Sheet 5
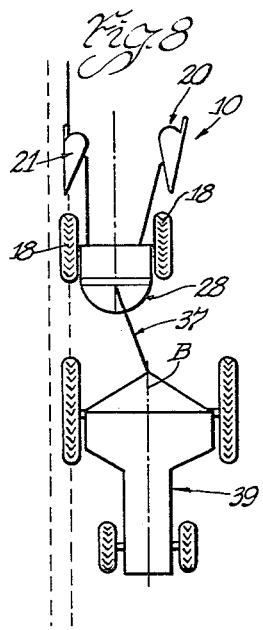
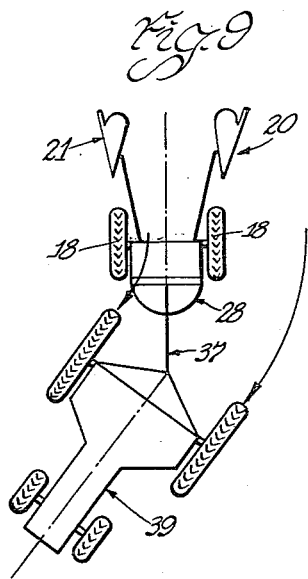
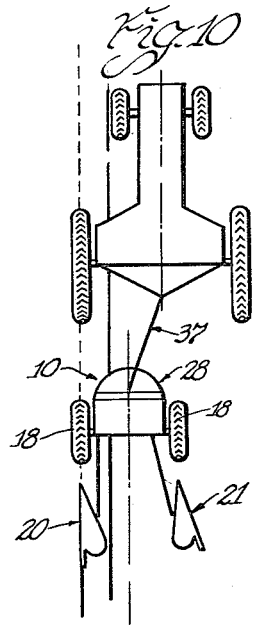
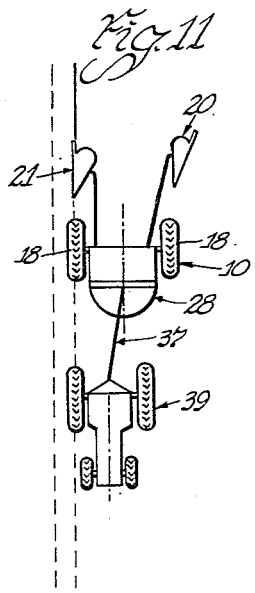
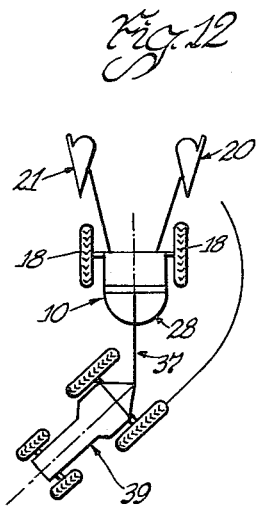
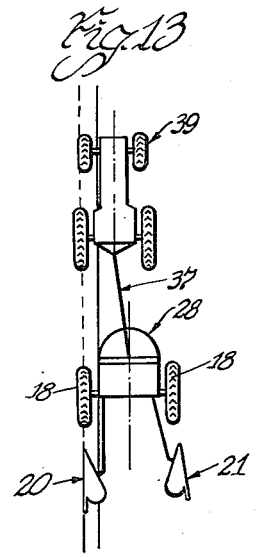
Inventor
Bernard Wild
By Paul O. Pippel
Atty.

United States Patent Office 2,761,367
Patented Sept. 4, 1956

2,761,367

AUTOMATIC HITCH FOR TWO-WAY PLOW

Bernard Wild, Creil, France, assignor to International Harvester Company, a corporation of New Jersey Application September 3, 1952, Serial No. 307,638

8 Claims. (Cl. 97—29)

This invention relates to agricultural implements and particularly to implements of the trailing type adapted for attachment to a tractor or other vehicle to be drawn therebehind. More specifically the invention concerns a plow of the two-way or alternating type wherein a pair of laterally spaced plow units are arranged for alternate operation.

The function of a two-way plow is to accommodate plowing in succeeding rows in opposite directions in a field while causing the dirt displaced by the plow bottoms to be thrown in one direction. The operating plow unit rides adjacent one of the tractor drive wheels, the latter traveling in the furrow previously made. When plowing in the opposite direction the other plow unit travels adjacent the opposite drive wheel. It is essential that the tractor wheel travel in the furrow previously made to establish the position that the working plow bottom must occupy with respect to that wheel in order to maintain a uniform width of cut. With a tractor having fixed rear wheel spacing and a trailing plow designed for that particular tractor, this correct positioning of the plow bottoms presents no problem. However, were the tractor wheels adjustable for wider or narrower spacing, or were the same plow drawn by a different tractor having different wheel spacing, the working plow bottom could not assume the position necessary for a uniform width of cut unless provision were otherwise made for adjusting the hitch point of the plow upon the tractor. With the increased tempo of modern diversified farming and the trend toward multi-purpose implements and tractors, it is important that an implement of the type referred to be adaptable to tractors of various sizes and wheel spacings without the tedious adjustments previously required.

Therefore, it is the principal object of the present invention to provide in a two-way plow means for automatically moving the hitch point to place the working plow bottom in correct position with respect to the furrow wheel of the tractor.

Another object of the invention is the provision of an improved hitch device for a two-way plow which is simple in construction, operates easily and is readily adaptable for accommodating the plow hitch to tractors of widely divergent rear wheel spacing.

Another object of the invention is the provision of a novel tripping mechanism for the swinging hitch of a two-way plow operative to properly permit the plow to swing to one side or the other relative to the tractor in order to place the operating plow bottom in its proper position with respect to the adjacent drive wheel.

In modern farming operations it is not unusual to mount at different times a two-way plow upon tractors having several wheel spacings. The wheels of one tractor can be closely spaced to provide a narrow tread, whereas in another tractor or in the same tractor the wheels may be extended to provide a more normal width of tread, while under other conditions extremely wide spacing of the drive wheels is desired. Assuming the tractor drive wheels to be of a certain spacing, such as a normal spacing, the respective plow bottoms will assume a correct plowing position with regard to the associated tractor wheel without movement of the hitch. On the other hand, if a tractor be employed having a narrower tread, or rear wheel spacing, so that the operating plow bottom would normally travel laterally outwardly from the associated drive wheel, the hitch must be swung laterally in one direction to bring the plow bottom inwardly to a correct plowing position with respect to the drive wheel. If we assume, however, that a much wider wheel spacing is utilized so that the plow would normally ride too far inwardly of the associated drive wheel of the tractor, the hitch must be swung in the opposite direction to cause the operating plow bottom to move laterally outwardly toward the associated drive wheel to assume a correct operating position with respect thereto. The present invention, therefore, contemplates the provision of a hitch which will place the alternating plow bottoms in correct operating position with respect to the tractor wheels.

Other objects and advantages of the invention will become clear from the following detailed description when read in conjunction with the accompanying drawings, wherein:

Figure 1 is a perspective view of a two-way plow having incorporated therein a hitch structure embodying the features of this invention;

Figure 2 is a plan view of the hitch structure and a portion of the plow units, with parts removed for clarity, showing the automatically-operable releasing mechanism for allowing the drawbar of the hitch to swing to one side or the other, and wherein the plow is connected to a wide tread tractor;

Figure 3 is a plan view of the structure shown in Fig. 2 and illustrating the arrangement of parts with the plow attached to a tractor having a narrow tread;

Figure 4 is a view in side elevation and partly in section of the hitch structure of this invention with parts of the right hand plow unit being shown in the operating position thereof;

Figure 5 is a detail in perspective showing the crank arm operated by the half-revolution type clutch utilized for lifting the respective plow units and the manner in which the operation of this crank trips the latching mechanism for the hitch;

Figure 6 is an enlarged sectional view taken on the line 6—6 of Fig. 3;

Figure 7 is an enlarged section on the line 7—7 of Fig. 3;

Figures 8 to 13, inclusive, illustrate diagrammatically, the manner in which the plow is operated in the field, Figs. 8 to 10 showing the plow behind a wide tread tractor, and Figs. 11 to 13 showing the plow drawn behind a narrow tread tractor.

The automatic hitch structure of this invention may be readily adapted to several types of two-way plows, and the two-way plow illustrated in the drawings is of a more or less conventional construction, apart from the hitch, and will not be described in detail. Generally, however, it may be noted that the two-way plow with which this invention is concerned, is of the trail-behind type and comprises a generally U-shaped frame designated by numeral 10, including a transverse portion 11 and laterally spaced rearwardly extending arms 12 and 13, the rear ends of which are curved upwardly and support therebetween a transverse shaft 14 which has mounted thereon a pair of laterally spaced rocking beams 15 and 16.

The arms 12 and 13 of the frame support stub-shafts 17 upon which are journaled ground-engaging wheels 18. Likewise mounted upon each of the stub-shafts 17 is a half-revolution clutch designated generally by the numeral 19 which is of a type well-known in the art.

Also secured to the transverse or bight portion 11 of the frame 10 and extending rearwardly therefrom are the laterally spaced, alternately operable left and right-hand plowing units 20 and 21, respectively. These units are substantial duplicates and each is connected at its forward end to the frame for vertical pivotal movement relative thereto. This vertical movement of the plow unit is accomplished by actuation of a crank arm 22 secured to the inner end of each stub-axle 17, and rotatable in response to turning of the associated ground wheel upon actuation of the clutch by a clutch release lever 23. Clutch release lever 23 has connected thereto a cable or rope 24 which extends to the tractor in a position accessible to the tractor operator. When the tractor operator desires to vertically move one of the plow units he pulls upon this cable to actuate the release lever 23, causing the associated clutch to operate and the crank arm 22 to rotate with the associated ground wheel in a manner well known in the art. The crank arm 22 on the right hand side of the plow is connected by a thrust rod 25 with one end of the rocking beam 16. The other end of the rocking beam 16 is connected to the extension of a manually-operated hand lever 26, mounted upon a toothed quadrant 27 which, in turn, is mounted upon the frame of the right hand plowing unit 21. The half-revolution clutch of the left hand ground-engaging wheel 18 is similarly connected to the left hand rocking beam 15.

In Figure 1 the right hand plowing unit is shown in its raised position and this is comparable to the position of the parts shown in dotted lines in Figure 5. When it is desired to lower this right hand unit to operating position the operator trips his release lever 23, actuating the associated clutch 19 and causing the crank arm 22 to move into the solid line position shown in Figure 5, thus exerting thrust through the link or rod 25 to rock the beam 16 in a counterclockwise direction and move the plowing unit 21 downwardly. When it is desired to raise the individual plow unit this procedure is repeated, the crank arm 22 moving approximately 180 degrees to the position shown in dotted lines in Figure 5.

The plow hitch of this invention is generally designated by the numeral 28 and comprises an arcuately-shaped supporting frame member 29 having its rear ends pivotally connected respectively to rearwardly extending bars 30 and 31. The hitch frame 29 is braced by the transversely extending cross-piece or brace member 32. Bars 30 and 31 extend rearwardly and are secured, respectively, at their rear ends to the arms 12 and 13 of the plow frame 10 adjacent the ground wheels 18. The forward ends of these bars 30 and 31 are connected to the frame 10 by one or more straps 33.

A vertically extending pivot pin 34 passes through the brace member 32 and has mounted upon its upper and lower ends the vertically spaced bars 35 and 36 of a swinging drawbar 37. The members 35 and 36 of the drawbar straddle the arcuate portion 29 of the hitch and the forward end thereof is provided with a clevis 38 for connection to a propelling vehicle such as a tractor designated by the numeral 39. The drawbar 37 thus is capable of lateral swinging movement about the axis of the pivot pin 34 upon the arcuate frame 29 of the hitch structure to opposite sides of a center line through the plow.

Also mounted upon the pivot pin 34 between the bars 35 and 36 and above the cross-piece 32 is a star wheel 40 having a pair of adjacent projecting arms 41 and 42. Arm 41 is provided at its end with a pivot pin 43 upon which is mounted one end of a rod or link 44 comprising a part 45 having a pair of flanges 46 apertured to slidably receive a rod 47, the forward end of which is pivotally connected to the outer end of a latch member 48, the other end of which is pivotally mounted upon a pin 49 carried by a bracket 50 adjustably mounted upon the arcuate frame bar 29. A spring 51 is mounted upon the rod 47 between the end flange 46 and a collar 52 mounted on the rod. Rotation of the star wheel 40 in opposite directions will move the hook or latch member 48 toward and away from the inner surface of the arcuate member 29. A link member 53 similar to link 44 and of identical construction is pivotally mounted upon a pin 54 carried in the end of the adjacent arm 42 of the star wheel 40. The forward end of this link 53 is pivotally connected to another latch member 55 pivotally mounted upon a pin 56 carried by a bracket 57 adjustably secured to the arcuate member 29 of the hitch frame.

As will be noted in Figure 2, the drawbar 37 carries a pin 58 which extends vertically through the members 35 and 36 and serves as a strike receivable in the hook portion of the latch 55 upon swinging of the drawbar laterally about its pivot 34 in the direction of the latch 55. The direction of swinging of the drawbar 37 is determined by the plow unit in operating position, and the swinging of the draft bar 37 from one side to the other upon release of the appropriate latch 48 or 55 is accomplished by movement of the operating plow bottom into operating position. The position of the draft bar 37 on the arc 29 of the hitch frame is determined by the width of the tractor and automatic operation of the hitch occurs as follows:

The star wheel 40 is also provided with projecting arms 59 and 60, respectively, oppositely disposed from the arms 42 and 41 about the axis of the pin 34. The arm 60 is connected by a link 61 with one arm 62 of a bell crank 63 pivoted upon a pin 64 mounted on the brace bar 32 and extending upwardly therefrom. The other arm 65 of the bell crank is connected by a link 66 with a trip lever 67 which is pivoted upon a pin 68 mounted on a bracket 69 secured to the right hand member 31 of the hitch frame. Trip lever 67 is provided with a projection 70 which is engageable by a roller 72 on a lug 71 affixed to and extending at right angles from the crank arm 22 which, as pointed out before, is operative upon actuation of the half-revolution clutch carried by the adjacent wheel 18 to move the right hand plow unit vertically and lower it to its operating position.

The raising of the left hand plow unit to the position of Figure 2 is accomplished by the operator pulling upon the left hand cable 24 to actuate the associated clutch 19. This operation is accompanied by rotation of left hand crank arm 22 in a direction to cause laterally projecting roller 72 mounted on the lug 71 to engage projection 70 on trip lever 67. It should be understood here that the parts 61 to 72 on right and left hand sides of the implement are substantial duplicates, these parts on the right hand side being primed to facilitate understanding of the operation. The trip lever 67 is, in turn, caused to rotate in a direction to move link 66 rearwardly. Rearward movement of the left hand link 66 causes counterclockwise rotation of the left hand bell crank 63, as viewed in Figure 2, to cause clockwise rotation of the star-shaped wheel 40, thus causing the arm 41 to move link 44 forwardly and close the latch 48. Interconnection is provided between latches 48 and 55, and at the time the drawbar 37 swings to the position of Figure 2, the turning of the star-shaped wheel 40, acting through the arm 42 and link 53, urges the latch 55 into open position, allowing latch 48 to engage with the pin 58 on the drawbar. This sequence of operations occurs, for example, at the end of a field, when the operating plow unit is raised and the other unit lowered for plowing in the opposite direction. The operations of actuating the two clutches 19 to raise one plow unit and lower the other usually occur in rapid succession so that, when drawbar 37 is released from one latch by raising of one plow unit, the draft load resulting from penetration of the other plow unit into the ground swings the drawbar into locked position with the other latch. There are, of course, instances when both of the plow units are raised, that the drawbar will occupy a central position between the two latches, and this may occur, for example, when crossing waterways and the like. Lowering of one plow unit to working position then forces the drawbar into cooperative relation with one of said latches. In Figure 2 the plow is shown attached to a wide tread tractor wherein the tread is wider than that of the plow wheels. Movement of drawbar 37 to the left is necessary to cause the right hand plow unit to occupy a correct plowing position with respect to the right hand drive wheel of the tractor. Release of latch 55 follows lifting of the left hand unit, and swinging of the drawbar to the left follows the lowering of the right hand plow unit into the ground. The reverse of this procedure occurs when the left hand plow unit is to be placed in operating position while the right hand plow unit is raised. Provision is therefore made for connection of the star wheel 40 with the trip lever 67' on the right hand plow unit and since this operation is a duplication of that affecting the left hand plow unit, no special description thereof is indicated other than to note that the arm 59 of the star wheel 40 is connected by a similar link 61' to the arm 62' of bell crank 63' pivoted upon a pin 64' at the right hand end of cross-piece 32. Connection with the right hand trip lever 67' is made by the other arm 65' of the bell crank and another link 66'.

The operation of the automatic hitch when the plow is mounted behind a wide tread tractor has already been noted. A different movement is required when the plow is mounted behind a narrow tread tractor because the draft bar 37 must necessarily swing to the right in order to move the plow laterally to the left to place, for example, the right hand plow unit in correct position relative to the right hand tractor wheel, the tractor wheels being designated in Figure 2 for the wide tread tractor by the letter A, and in Figure 3 for a narrow tread tractor by the letter B. The clamps 50 and 57, supporting the latches 48 and 55 respectively, are, of course, laterally adjustable on the arc 29 according to the width of the tractor. If we assume that the plow is connected to a tractor having the narrow spacing designated by the wheels B, then the draft bar 37 must be swung to the right or to the left, depending upon the plow bottom which is to be placed in operating position. If we assume that the draft bar 37 is centrally located and unattached to either of the hook members 48 or 55 and that the right hand plow bottom is to be placed in operating position, the right hand link 61' connecting arm 60 of the star wheel 40 to arm 62' of bell crank 63' will be released from the arm 60 and connected to the arm 42, thus being connected to the same arm to which link 53 is connected. Similarly, left hand link 61 will occupy the position shown in Figure 3, forming a connection between the arm 41 of the star wheel and arm 62 of left hand bell crank 63. Thus, upon actuation of left hand trip lever 67 and movement of the left hand plow unit to raised position, left hand bell crank 63 will be turned counterclockwise and, by virtue of the connection of link 61 to arm 62, star wheel 40 will be rotated counterclockwise so that latch 55 will be closed and latch 48 will move to an open position as the drawbar 37 swings laterally to the right to move the plow to a correct plowing position with respect to the right hand tractor wheel B. Swinging of the drawbar occurs as a result of the drag of the right hand earth-penetrating plow bottoms as they enter the ground.

It should be clear that the movement of one plow unit to raised position effects the closing of the latch on one side and the opening of the other latch.

In order to resiliently hold the star wheel 40 in position upon movement of the drawbar 37 to its proper position for plowing, there is provided a rod 73 pivotally connected to a lug 74 secured to the star wheel 40 and extending rearwardly therefrom. Rod 73 is slidable in an aperture provided in upwardly extending flange 75 of a bracket 76 affixed centrally of and projecting rearwardly from the cross-piece 32. A spring 77 surrounds the rod 73 between the lug 74 and the flange 75, acting in compression and, as indicated in Figure 2, urging the star wheel 40 to clockwise rotation, thus tending to hold the latch 55 in the locked position shown. Upon rotation of the star wheel 40 in a counterclockwise direction the pivotal connection of rod 73 to the lug 74 will move over center from that shown in Figure 2 and the spring 77 will urge the star wheel to counterclockwise rotation so that the other latch 48 will be urged toward its open position and the latch 55 to remain locked, as shown in Figure 3.

Operation of a two-way plow when plowing in opposite directions in a field is illustrated diagrammatically in Figures 8 to 13. In Figs. 8, 9 and 10 the plow is drawn behind a wide tread tractor, the right hand plow unit 21 being shown in operating position in Fig. 8. In Fig. 9, both plow units have been raised and the tractor is turning as at the end of a field to bring the plow in correct position for plowing in the opposite direction. Fig. 10 shows the left hand plow unit 20 in operation in correct plowing position with respect to the left hand tractor drive wheel.

In Fig. 11, with the plow drawn behind a narrow tread tractor and links 61, 61 removed from star wheel arms 59 and 60 and connected to arms 41 and 42, it will be noted that the drawbar has swung in a direction opposite that in Fig. 8, although the tractor is traveling in the same direction and the right hand plow unit 21 is in operation. The turning of the tractor to reverse the direction of plowing and bring the left hand unit 20 into operating position behind the left hand drive wheel of the tractor is shown in Figs. 12 and 13.

The operation of the automatic hitch of this invention should be clearly understood from the foregoing description. It should likewise be understood, however, that modifications may be made in the invention without departing from the spirit thereof or the scope of the appended claims.

What is claimed is:

1. In a two-way plow including left and right hand alternating plow units and independently operable power lift devices for raising and lowering the plow units, an automatically operable switch comprising a frame structure, a longitudinally extending drawbar pivoted to the frame for lateral swinging and having means thereon for connection to a draft source, laterally spaced latches mounted on the hitch frame engageable with the drawbar to prevent swinging thereof, link means operatively connected at one end to one of said lift devices and operatively and detachably connected at the other end to one of said latches for releasing the other upon actuation of the said one lift device, said link means being detachable from its connection with said one of said latches and operatively connectable to the other of said latches to release the latter upon actuation of said one of said lift devices, the connection of said one of said lift devices to said latches including means interconnecting said latches and operative to effect positive closing of one latch upon release of the other.

2. The invention set forth in claim 1, wherein said interconnecting mechanism includes a star wheel having a pair of arms connected to said latches and so arranged that one latch is closed and the other opened upon rocking of the star wheel in one direction, and linkage operatively connecting the lift devices to said star wheel for rocking the latter in response to actuation of the lift devices.

3. The invention set forth in claim 2, wherein said linkage is connected to the star wheel at locations circumferentially spaced from the connections of the latches thereto, and wherein means are provided for optionally connecting said linkage to the star wheel in other locations to reverse the direction of rocking thereof in response to actuation of said lift devices.

4. In a two-way plow including left and right hand alternating plow units and independently operable power lift devices for raising and lowering the plow units, an automatically operable hitch comprising a frame structure, a longitudinally extending drawbar pivoted to the frame for lateral swinging and having means thereon for connection to a draft source, left and right hand latches mounted on the hitch frame and engageable with the drawbar upon lateral movement thereof to one side or the other in accordance with the direction of side draft on the plow, link means operatively connected at one end to the lift device for the left hand plow unit operatively and detachably connected at the other end to the left hand latch for releasing the latter upon actuation of the left hand lift device to raise the left hand plow unit, said link means being detachable from its connection with said left hand latch and operatively connectable to the right hand latch to release the latter in response to the raising of said left hand plow unit.

5. In a two-way plow including left and right hand alternating plow units and independently operable power lift devices for raising and lowering the plow units, an automatically operable hitch comprising a frame structure, a longitudinally extending drawbar pivoted to the frame for lateral swinging and having means thereon for connection to a draft source, left and right hand latches mounted on the hitch frame and engageable with the drawbar upon lateral movement thereof to one side or the other in accordance with the direction of side draft on the plow, link means operatively connected at one end to the lift device for the left hand plow unit operatively and detachably connected at the other end to the left hand latch for releasing the latter upon actuation of the left hand lift device to raise the left hand plow unit, said link means being detachable from its connection with said left hand latch and operatively connectable to the right hand latch to release the latter in response to the raising of said left hand plow unit, the connection of said left hand lift device to said latches including means interconnecting said latches and operative to effect positive closing of one latch upon release of the other.

6. In a two-way plow including a frame, alternating left and right hand plow units mounted on the frame and having independently operable left and right hand power lift devices for raising and lowering the respective plow units, an automatically operable hitch structure comprising a hitch member having laterally spaced left and right hand latches thereon, a longitudinally extending drawbar pivotally mounted on the hitch member for lateral swinging to operative engagement with said latches in response to side draft on the plow, link means operatively connecting the left and right hand power lift devices to the left and right hand latches, respectively, to close the latch on one side and lock the drawbar in position in response to movement of the associated plow unit to raised position, the said link means connected to the power lift device on one side of said plow being disconnectable from the latch on said one side of the plow and operatively connectable to the latch on the other side of said plow.

7. In a two-way plow including left and right hand alternating plow units and independently operable power lift devices for raising and lowering the plow units, a hitch structure comprising a frame, a longitudinally extending drawbar pivoted to the frame for lateral swinging, laterally spaced latches mounted on the hitch frame, said drawbar being laterally swingable to latching position with respect to said latches, a rockable member mounted on the hitch frame having arms projecting radially therefrom, means operatively connecting said latches to the arms of said rockable member, the connection of the latches to the rockable member being such that rocking of said member in one direction effects opening one latch and closing the other, linkage operatively connecting each said plow unit to the rockable member for rocking the latter in one direction upon movement of a selected plow unit to raised position, said linkage being disconnectable from said rockable member and connectable thereto at other locations to effect rocking thereof in another direction.

8. In a two-way plow including left and right hand alternating plow units and independently operable power lift devices for raising and lowering the plow units, a hitch structure comprising a frame, a longitudinally extending drawbar pivoted to the frame for lateral swinging, laterally spaced latches mounted on the hitch frame, said drawbar being laterally swingable to latching position with respect to said latches, a rockable member mounted on the hitch frame having arms projecting radially therefrom, means operatively connecting said latches to the arms of said rockable member, the connection of the latches to the rockable member being such that rocking of said member in one direction effects opening one latch and closing the other, linkage operatively connecting each said plow unit to the rockable member for rocking the latter in one direction upon movement of a selected plow unit to raised position, said linkage being disconnectable from said rockable member and connectable thereto at other locations to effect rocking thereof in another direction, and a spring pressed connecting device between the hitch frame and the rockable member for yieldingly holding the latter in position after rocking thereof in either direction.

References Cited in the file of this patent

UNITED STATES PATENTS

| | | |
|---|---|---|
| 2,363,901 | Silver | Nov. 28, 1944 |
| 2,385,935 | Oerman | Oct. 2, 1945 |
| 2,575,527 | Oerman | Nov. 20, 1951 |